(12) United States Patent
Castro Castro et al.

(10) Patent No.: US 9,356,975 B2
(45) Date of Patent: May 31, 2016

(54) METHOD AND APPARATUSES FOR TDF SESSION ESTABLISHMENT

(75) Inventors: Fabian Castro Castro, Madrid (ES); Marta Montejo Ayala, Getafe (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 220 days.

(21) Appl. No.: 14/237,543

(22) PCT Filed: Sep. 16, 2011

(86) PCT No.: PCT/EP2011/066142
§ 371 (c)(1),
(2), (4) Date: Feb. 6, 2014

(87) PCT Pub. No.: WO2013/037421
PCT Pub. Date: Mar. 21, 2013

(65) Prior Publication Data
US 2014/0189137 A1    Jul. 3, 2014

(51) Int. Cl.
*G06F 15/16* (2006.01)
*H04L 29/06* (2006.01)
(Continued)

(52) U.S. Cl.
CPC .......... *H04L 65/1069* (2013.01); *H04L 43/028* (2013.01); *H04M 15/66* (2013.01); *H04L 43/12* (2013.01); *H04L 67/141* (2013.01); *H04W 4/24* (2013.01)

(58) Field of Classification Search
CPC ............ H04L 12/1407; H04L 41/0893; H04L 12/2602; H04L 63/20; H04L 63/102; H04L 12/1435; H04M 15/64; H04M 15/66; H04M 15/8022; H04W 4/24
See application file for complete search history.

(56) References Cited

U.S. PATENT DOCUMENTS

2010/0186064 A1* 7/2010 Huang .................... H04L 12/14
726/1
2011/0302289 A1* 12/2011 Shaikh .............. H04L 29/12216
709/223

(Continued)

OTHER PUBLICATIONS

3GPP: "3rd Generation Partnership Project; Technical Specificaton Group Services and System Aspects; Policy and Charging Control Architecture (Release 11 )", Jun. 1, 2011, XP002680577, Retrieved from the Internet: URL:http:llwww.3gpp.orglftp/Specslhtml-info123203.htm [retrieved on Jul. 20, 2012] consisting of 142-pages.*

(Continued)

*Primary Examiner* — Chirag R Patel
*Assistant Examiner* — Jean P Mendez Flores
(74) *Attorney, Agent, or Firm* — Christopher & Weisberg, P.A.

(57) ABSTRACT

More than one TDF session for a user in a PCC architecture are coordinated. There are provided PCRF server, PCEF devices and TDF devices, and method of coordinating a PCEF session and the more than one TDF session. The method includes: establishing or modifying at a PCRF server a PCEF session for an IP-CAN session; selecting at the PCRF server more than one TDF device; determining at the PCRF server an order in which each selected TDF device is to be involved, and access information required by each selected TDF device; initiating a TDF session, providing applicable ADC rules and routing information indicating a next TDF device to be involved, from the PCRF server towards each selected TDF device; and submitting from the PCRF server to the PCEF device PCC rules for the IP-CAN session along with routing information indicating a first TDF device to be involved.

22 Claims, 11 Drawing Sheets

(51) Int. Cl.
  *H04M 15/00* (2006.01)
  *H04L 12/26* (2006.01)
  *H04W 4/24* (2009.01)
  *H04L 29/08* (2006.01)

(56) References Cited

U.S. PATENT DOCUMENTS

| | | | |
|---|---|---|---|
| 2012/0246325 A1* | 9/2012 | Pancorbo Marcos | H04L 12/2602 709/227 |
| 2012/0284394 A1* | 11/2012 | Rasanen | H04L 41/0873 709/224 |
| 2015/0011182 A1* | 1/2015 | Goldner | H04M 15/66 455/406 |

OTHER PUBLICATIONS

International Search Report and Written Opinion for International Application No. PCT/EP2011/066142, International Filing Datge: Sep. 16, 2011 consisting of 12-pages.
3GPP: "3rd Generation Partnership Project; Technical Specificaton Group Services and System Aspects; Policy and Charging Control Architecture (Release 11)", Jun. 1, 2011, XP002680577, Retrieved from the Internet: URL:http://www.3gpp.org/ftp/Specs/html-info/23203.htm [retrieved on Jul. 20, 2012] consisting of 142-pages.
Allot Communications et al.: "TDF: TS 23.203 Section 7 modifications", 3GPP DRAFT; S2-105695, 3RD Generation Partnership Project (3GPP), Mobile Competence Centre ; 650, Route des Lucioles ; F-06921 Sophia-Antipolis Cedex; France, vol. SA WG2, No. Jacksonville; 20101115, Nov. 9, 2010, XP050468072, [retrieved on Nov. 9, 2010] consisting of 19-pages.

* cited by examiner

METHOD AND APPARATUSES FOR TDF SESSION ESTABLISHMENT

TECHNICAL FIELD

The present invention generally relates to establishment of a session between a Policy and Charging Rules Function (hereinafter PCRF) and a Traffic Detection Function (hereinafter TDF). More specifically, the invention relates to selection of more than one TDF for detecting traffic.

BACKGROUND

The Policy and Charging Control (PCC) architecture and functionality is specified in 3GPP TS 23.203 (v.11.2.0) for Evolved 3GPP Packet Switched domain, including both 3GPP accesses (GERAN/UTRAN/E-UTRAN) and Non-3GPP accesses.

Conventionally, and for the purpose of the present invention, the Policy and Charging Control (PCC) architecture includes a Policy and Charging Enforcement Function (PCEF) in charge of traffic flow detection and enforcement of applicable policies to user traffic flows, a Policy and Charging Rules Function (PCRF) in charge of providing network control for the traffic flow detection by holding policies and providing PCC rules to the PCEF per user traffic flow basis for enforcement of such policies, a Traffic Detection Function (TDF) responsible of performing application detection and reporting detected applications and service data flow descriptions to the Policy and Charging Rules Function (PCRF) for the latter to provide new policies to be enforced by a Policy and Charging Enforcement Function (PCEF), an Application Function (AF) offering applications in which service is delivered in a different layer than the one the service has been requested and in charge of providing to the PCRF information related to session and media negotiated by a user, and a Subscription Profile Repository (SPR) in charge of providing subscription data for a user to the PCRF.

3GPP TS 23.203 (v.11.2.0) describes two ways for the TDF reporting to the PCRF: "Unsolicited", whereby services to be detected by the TDF are pre-configured in the TDF and are applicable for all users; and "Solicited", whereby services to be detected are provisioned by the PCRF on a per user and IP Connectivity Access Network (IP-CAN) session basis through provisioning of so-called Application and Detection Control (ADC) rules to the TDF.

Conventionally, the TDF makes use of ADC rules for notifying the PCRF of the beginning and end of application traffic. That is, the ADC rules can be used for identifying Layer 7 applications. In this respect, ADC rules can be used by Deep Packet Inspection (DPI) methods for traffic identification and classification. On the other hand, the PCC rules are significantly simpler than the ADC rules since the PCC rules deal with a Layer 3 Filter or IP 5-tuple. For example, an access to two different applications may be identified just by one single PCC rule, while two ADC rules will be needed for identifying the application properly (for instance, distinguishing between Skype and MSN on top of HTTP traffic).

Moreover, the ADC rules can be applied for all traffic in a whole IP-CAN session, whereas the PCC rules are associated with one bearer each, thus not likely being applicable for the whole IP-CAN session.

3GPP TS 23.203 (v.11.2.0) also defines two different ways for deploying the TDF function: 'collocated' with the PCEF, or as a 'stand-alone' component. For the TDF-PCEF collocated case, the PCRF may provide at IP-CAN session establishment the ADC rules together with the PCC rules to the TDF-PCEF. But for the stand-alone TDF, a so-called TDF session should be established in order to install the ADC rules.

Even though 3GPP TS 23.203 merely requires the TDF to perform application traffic detection, notification and policy control for the detected application traffic in implementing service awareness policy control, most of the deep packet inspection boxed in the market perform much more IP data traffic treatment, such as content filtering, content insertion, virus detection, data compression, etc.

Since more than one TDF may be required for a same IP-CAN session, each TDF being specialized in different functions, for example, fraud detection, virus scan, data compression, content enrichment, content filtering, etc, there is a need to coordinate each TDF session with the PCEF session, so that each TDF knows when an IP-CAN session, for which the TDF has to perform certain control or reporting, is established, modified or terminated.

SUMMARY

The present invention is aimed to at least minimize the above drawbacks and provides for a new method of coordinating a PCEF session with a plurality of TDF sessions, the former established with a PCEF device whereas the latter are respectively established with a plurality of TDF devices in PCC architecture with enhanced PCEF device and PCRF server, and with a plurality of TDF devices, they all arranged to support said method.

Throughout this specification, a PCRF server is a network element arranged for carrying out the functionality of a PCRF in accordance with conventional PCC standards; a PCEF device is a network element arranged for carrying out the functionality of a PCEF in accordance with conventional PCC standards; and a TDF device is a network element arranged for carrying out the functionality of a TDF in accordance with conventional PCC standards. Likewise, an AF device is a network element arranged for carrying out the functionality of an AF in accordance with conventional PCC standards. In addition, the PCRF server, the PCEF device and the TDF device throughout this specification are enhanced to accomplish the objects of the present invention.

In accordance with a first aspect of the present invention, there is provided a new method of coordinating sessions for a user respectively established with a PCEF device and a plurality of TDF devices of a PCC architecture with a PCRF server.

This method comprises the steps of: establishing or modifying at a PCRF server a PCEF session for an IP-CAN session; selecting at the PCRF server more than one TDF device to be provided with ADC rules for the IP-CAN session; determining at the PCRF server an order in which each selected TDF device is to be involved, and pieces of access information required by each selected TDF device; initiating a TDF session, providing correspondingly applicable ADC rules, and providing routing information, which indicates the order in which each selected TDF device is to be involved, from the PCRF server towards each selected TDF device; and submitting from the PCRF server to the PCEF device applicable PCC rules for the IP-CAN session along with routing information indicating a selected TDF device which is the first one to be involved. In particular, the routing information provided from the PCRF server to the PCEF device and TDF devices indicates a routing path that the IP packets shall follow to a next TDF device.

The selection of TDF devices may be carried out in this method upon a step of receiving at the PCRF server a trigger for selecting at least one TDF device. In particular, this trigger may be anyone of: an IP-CAN session establishment or modification received from the PCEF device, an AF session establishment or modification received from an AF device, a change of subscription notified from a SPR, or an internal trigger.

Advantageously, this method may comprise a step of extracting by the PCRF server access information from any request received from the PCEF device, in order to submit the required pieces of access information towards each selected TDF device. In particular, the access information received from the PCEF device may be anyone of: user identifier, location information, time zone, roaming information, usage information, radio access type, IP-CAN type, user equipment information, and combinations thereof.

In order to more easily fetch information about the TDF sessions, which are respectively established with each selected TDF device, and the PCEF session, which is established with the PCEF device, this method may further comprise a step of correlating the PCEF session with the TDF sessions at the PCRF server.

Generally speaking for this method, each selected TDF device may be specialized in at least one function selected from: content insertion, content filtering, fraud detection, virus scan, data compression, and combinations thereof.

On the other hand, since a TDF device generally makes use of the so-called DPI techniques, this method may benefit by including a step of reporting a detected application and its service data flow description from at least one selected TDF device to the PCRF server.

As for the selection of TDF devices, this method may advantageously comprise a step of receiving at the PCRF server a second trigger to terminate one or more TDF sessions, wherein the second trigger is anyone of: an IP-CAN session modification or termination from the PCEF device, an AF session modification or termination from the AF device, a change of subscription notified from a SPR, or an internal second trigger; and a step of initiating from the PCRF server a TDF session termination towards at least one selected TDF device.

In accordance with a second aspect of the present invention, there is provided a new PCRF server 1 of a PCC architecture with a PCEF device and a plurality of TDF devices.

This PCRF server 1 comprises: a processing unit arranged for establishing or modifying a session with a PCEF device for an IP-CAN session; a selector unit arranged for selecting more than one TDF device to be provided with ADC rules for the IP-CAN session; and arranged for determining an order in which each selected TDF device is to be involved, and pieces of access information required by each selected TDF device; and a sender arranged for initiating a TDF session, by providing the correspondingly applicable ADC rules, access information and routing information, which indicates the order in which each selected TDF device is to be involved, towards each selected TDF device; and also arranged for submitting to the PCEF device applicable PCC rules for the IP-CAN session along with routing information indicating a selected TDF device which is the first one to be involved.

In order to accomplish the advantageous selection of TDF devices in the above method, upon receipt of a trigger at the PCRF server, this PCRF server may further comprise a receiver arranged for receiving the trigger for selecting at least one TDF device, wherein the trigger is anyone of: an IP-CAN session establishment or modification received from the PCEF device, an AF session establishment or modification received from an AF device, a change of subscription notified from a SPR, or an internal trigger; and the selector unit may further be arranged for selecting the more than one TDF device as a response to the trigger.

Regarding the determination of access information required by each selected TDF device, the processing unit of the PCRF server may further be arranged for extracting access information from any request received from the PCEF device, the access information being anyone of: user identifier, location information, time zone, roaming information, usage information, radio access type, IP-CAN type, user equipment information, and combinations thereof.

Apart from that, the PCRF server may further comprise a memory arranged for correlating information related to the PCEF session, which is established with the PCEF device, with information related to the TDF sessions, which are respectively established with each selected TDF device.

In order to accomplish the advantageous termination of one or more TDF sessions in the above method, upon receipt of a second trigger at the PCRF server, the receiver of the PCRF server may be arranged for receiving the second trigger, wherein the second trigger is anyone of: an IP-CAN session modification or termination from the PCEF device, an AF session modification or termination from the AF device, or an internal second trigger; and the sender may further be arranged for initiating a TDF session termination towards at least one selected TDF device.

In accordance with a third aspect of the present invention, there is provided a new PCEF device of a PCC architecture with a PCRF server and a plurality of TDF devices.

This PCEF device comprises: a processing unit arranged for establishing or modifying a TDF session with a PCRF server for an IP-CAN session, and a receiver arranged for receiving from the PCRF server applicable PCC rules for the IP-CAN session along with routing information indicating a selected TDF device which is the first one to be involved.

In particular, the routing information received from the PCRF server indicates a routing path that the IP packets shall follow to a next TDF device. The PCEF device may thus further comprise a memory to likely store the PCC rules and the routing information.

In order to accomplish the advantageous selection of TDF devices in the above method, the PCEF device may further comprise a sender arranged for submitting to the PCRF server an IP-CAN session establishment or modification along with access information. In particular, the access information to be submitted may be selected from: user identifier, location information, time zone, roaming information, usage information, radio access type, IP-CAN type, user equipment information, and combinations thereof.

Generally speaking, the processing unit of the PCEF device may be arranged for installing and enforcing the PCC rules. Moreover, the processing unit of the PCEF device may be arranged for determining the next TDF device to be involved by using the received routing information.

In accordance with a fourth aspect of the present invention, there is provided a new TDF device of a PCC architecture with a PCRF server and a PCEF device.

This TDF device comprises: a receiver arranged for receiving from a PCRF server ADC rules for an IP-CAN session, and for receiving routing information, which indicates the order in which one or more TDF devices are to be involved; and a processing unit arranged for initiating a TDF session for the IP-CAN session.

In particular, as for the above PCEF device, the routing information received from the PCRF server indicates a routing path that the IP packets shall follow to a next TDF device. The TDF device may thus further comprise a memory to likely store the ADC rules and the routing information.

Regarding the report of a detected application and its service data flow description, the TDF device may further comprise a sender arranged for reporting a detected application and its service data flow description to the PCRF server.

Generally speaking, the processing unit of the TDF device may be arranged for installing and enforcing the ADC rules. Moreover, the processing unit of the TDF device may be arranged for determining the next TDF device to be involved, if any, by using the received routing information.

On the other hand, the invention may be practised by a computer program, in accordance with a fifth aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which.

DETAILED DESCRIPTION

The following describes currently preferred embodiments of PCRF server 1, PCEF device 3, TDF devices 2, 2a, 2b and method of coordinating a PCEF session, which is established with a PCEF device, with a plurality of TDF sessions respectively established with a plurality of TDF devices in PCC architecture.

Figure 8:
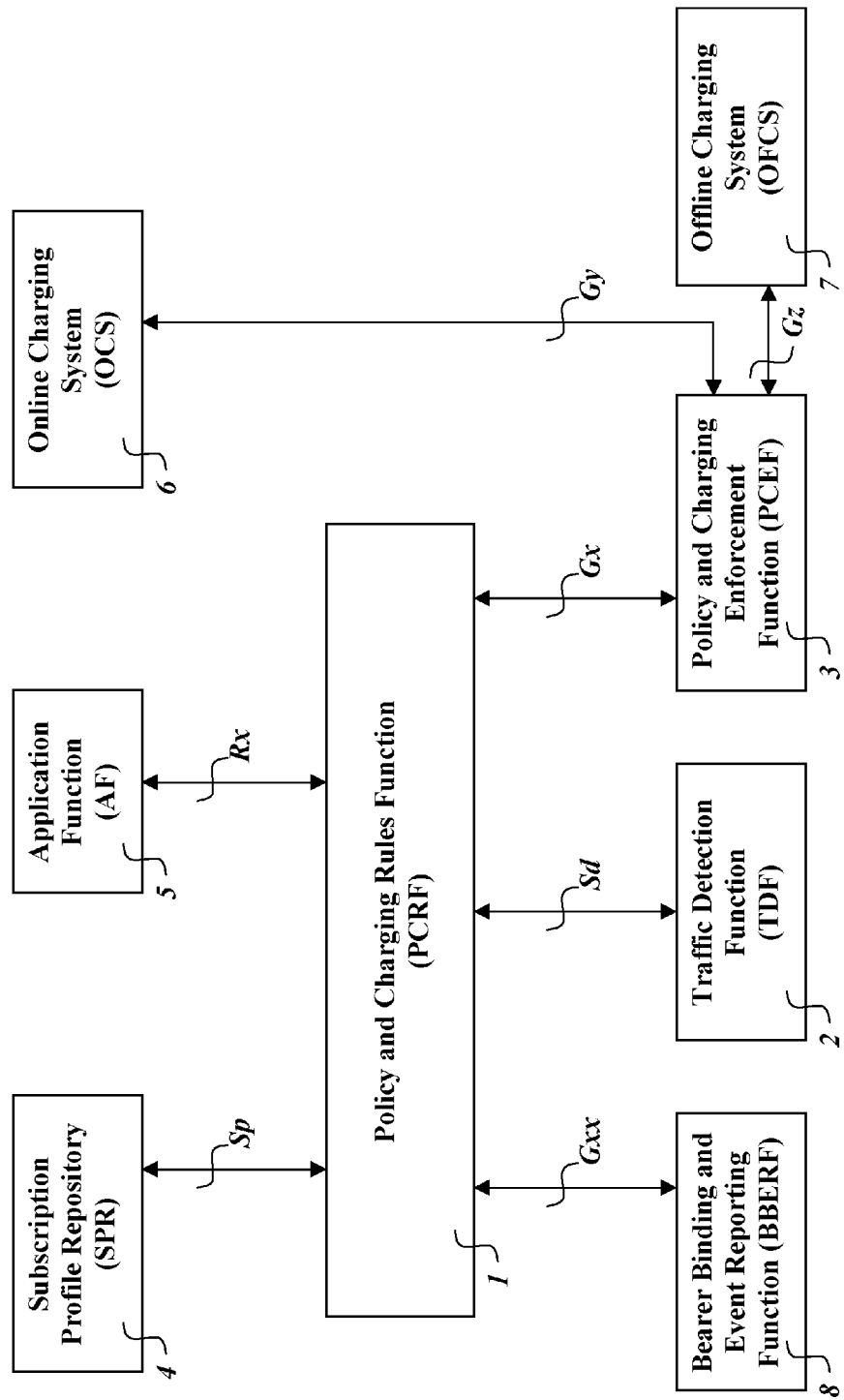
FIG. 8 shows functional elements of PCC architecture.

FIG. 8 illustrates a conventional PCC architecture where the PCRF server, the PCEF device and the TDF devices fit in accordance with the present invention. This PCC architecture, as described in 3GPP TS 23.203 (v.11.2.0), comprises functions of the PCEF 3, the Bearer Binding and Event Reporting Function (BBERF) 8, the PCRF 1, the Application Function (AF) 5, the TDF 2, the Online Charging System (OCS) 6, the Offline Charging System (OFCS) 7 and the Subscription Profile Repository (SPR) 4.

For the purpose of the present invention, the PCRF server, the PCEF device and the TDF devices, they all thus share the same references as the PCRF, PCEF and TDF entities generally referred in 3GPP TS 23.203 (V.11.1.0) and FIG. 8.

Figure 1:
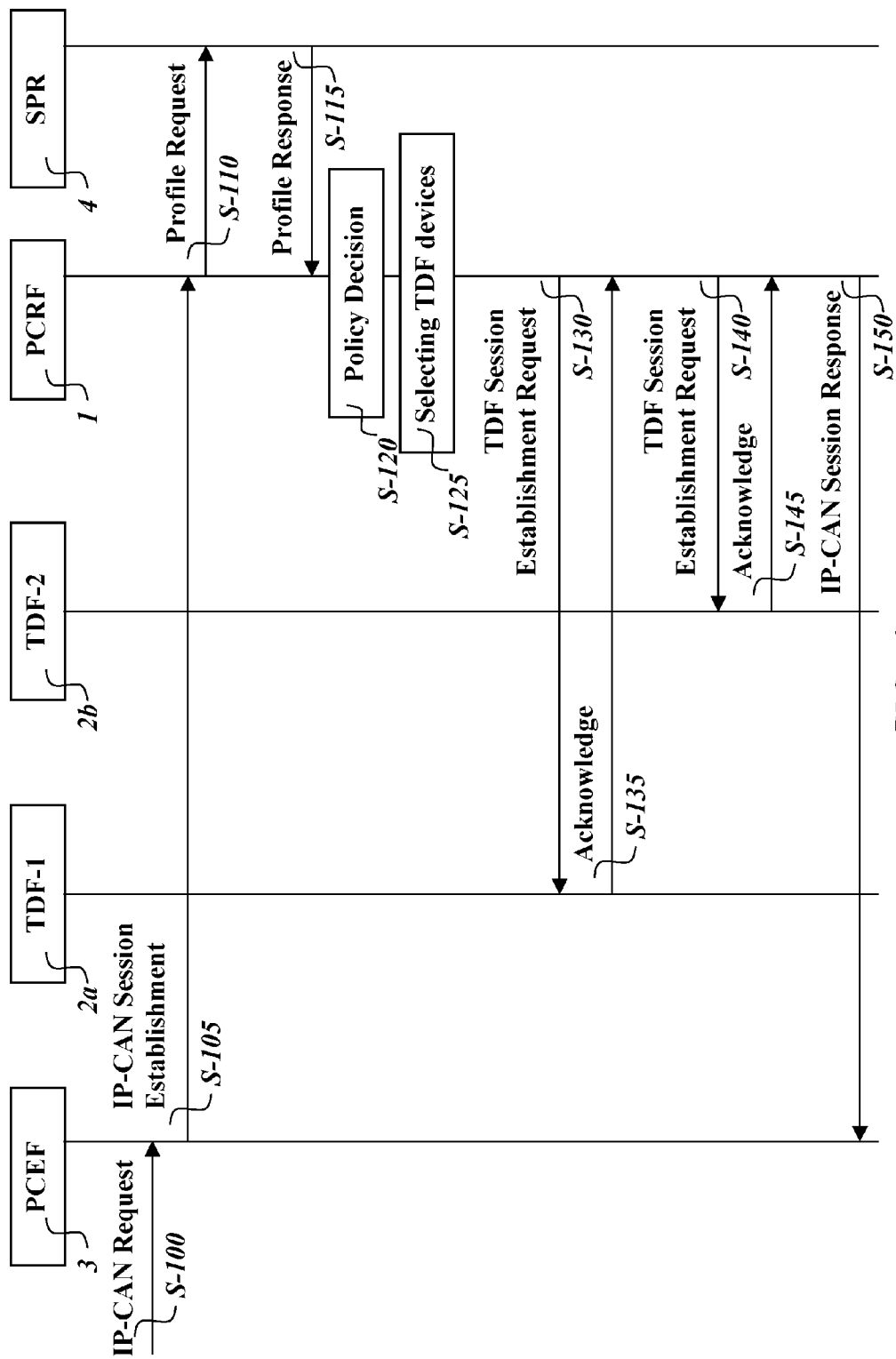
FIG. 1 exemplary represents a method of establishing TDF sessions in PCC architecture with more than one TDF device and with enhanced PCEF device and PCRF server.

FIG. 1 illustrates a method of establishing TDF sessions in PCC architecture with more than one TDF device 2a 2b and with a PCEF device 3 and a PCRF server 1.

As illustrated in FIG. 1, upon receipt of an IP-CAN request at the PCEF device 3, the PCEF device notifies the PCRF server 1 of the establishment of an IP-CAN session for a user in order to request PCC rules from the PCRF server 1 for handling such IP-CAN session.

In particular, the IP-CAN request may be generally received at a Gateway including the PCEF device, or may be received at the PCEF device, and the IP-CAN request may include a Packet Data Network (PDN) Connection Identifier. The Gateway or the PCEF device accepts the request and assigns an IP address for the user. Optionally, if required, a network prefix may also be assigned for the user.

More specifically, the PCEF device 3 notifies the PCRF server 1 of the establishment of an IP-CAN session in order to request authorization of allowed service or services and PCC Rules information. The PCEF device may include any amongst the following pieces of information: UE Identity (e.g. MN NAI), a PDN identifier (e.g. APN), the IP-CAN type and the IP address, the PDN Connection Identifier received for IP-CAN Bearer establishment, etc.

The embodiment illustrated in FIG. 1 assumes the PCRF server 1 does not have the subscriber's subscription related information. So, the PCRF server requests during a step S-110 a profile for the user to the SPR 4 in order to receive the information usable for the IP-CAN session. The PCRF server 1 provides the subscriber ID and, if applicable, the PDN identifier to the SPR 4, and may request notifications from the SPR on changes in the subscription information.

For the sake of simplicity, the terms 'user' and 'subscriber' may indistinctly be used throughout this specification and always referring to the same concept: a user of the service who is subscriber of the telecommunication network offering the service, unless otherwise explicitly provided.

Once the PCRF server receives the subscriber profile during a step S-115 from the SPR 4, the PCRF server 1 may make the authorization and policy decision during a step S-120. A successful authorization and policy decision leads to the establishment of a PCEF session at the PCRF server 1 for the IP-CAN session, as well as decisions on Quality of Service (QoS), charging, etc.

In particular, a PCEF session initially comprises data received from the PCEF device and related to the IP-CAN session established at the PCEF device. The PCEF session may further include, or may further be updated, with data received from an AF 5 for generating PCC rules, the PCC rules installed at the PCEF device, or with data further received from the PCEF device and related to any modification of the IP-CAN session whilst the latter is established at the PCEF device.

Apart from that, in accordance with the present invention, the PCRF server 1 also decides if more than one TDF devices shall be involved in this IP-CAN session for the user. More precisely, the PCRF server 1 selects during a step S-125 one or more TDF devices to be provided with Application and Detection Control "ADC" rules for the IP-CAN session. These decision and selection may depend on dynamic information received in the IP-CAN session establishment request or may depend on subscriber profile preferences. For example, the PCRF server 1 may select a first TDF device 2*a* to apply data compression only if the Radio Access Type received in the IP-CAN session establishment request indicates a GPRS access, or the PCRF server 1 may select a second TDF device 2*b* to apply virus scan if the user is a subscriber with subscription to the service "virus protection". In this respect, and generally speaking, each selected TDF device may be specialized in a different function, such as content insertion, content filtering, fraud detection, virus scan, data compression, and combinations thereof may be.

Also during this step, or considered as a next step, the PCRF server 1 may determine the order in which each selected TDF device is to be involved, that is, the order to be followed in analysing the traffic through the list of selected TDF devices 2*a* 2*b*, as well as the PCRF server 1 may determine those pieces of access information required by each selected TDF device. For the above exemplary embodiment of virus scan and data compression, a logical sequence may be to first perform the virus detection over each packet payload and then the data compression. Moreover, the PCRF server 1 may also determine for each selected TDF device the circumstances or conditions upon which the TDF device is to be informed and the information to be provided. For example, where a TDF device performs data compression, such TDF device may be informed about Radio Access Type changes, since the compression to be applied may be different; however, this event is not relevant for a TDF device in charge of virus detection.

Once the selected TDF devices and required information have been determined, the PCRF server 1 requests during the steps S-130 and S-140 establishment of respective TDF sessions to more than one TDF device, exemplary, a first TDF device 2*a* and a second TDF device 2*b*, provides correspondingly applicable ADC rules, and provides routing information, which indicates the order in which each selected TDF device is to be involved, towards each selected TDF device. In addition, since there is no signalling interface between the PCEF device and the TDF device, and since the TDF device is not aware of the access network information, the PCRF may also download to the TDF device all or part of the information received from the PCEF device along with the IP-CAN session establishment request.

Regarding the routing information submitted from the PCRF server 1 to the TDF devices 2*a* and 2*b*, where the order determined in previous step is: the first TDF device 2*a* and then the second TDF device 2*b*, the PCRF server 1 submits to the TDF device 2*a* an identifier of the TDF device 2*b* as routing information, whereas the PCRF server 1 does not submit to the TDF device 2*b* any identifier of a TDF device, thus indicating that the second TDF device 2*b* is the last TDF device to be involved.

Apart from that, the PCRF server 1 may subscribe to certain events that can be different per TDF device basis. For example, subscription to detection start and detection stop event triggers, virus detection and others.

Then each selected TDF device 2*a* 2*b* respectively acknowledge to the PCRF server 1 during steps S-135 and S-145 the establishment of each respective TDF session, and may accept or reject the installation of the ADC rules provided by the PCRF server.

Where the TDF sessions have been established, the PCRF server 1 submits during a step S-150 to the PCEF device the IP-CAN session establishment response with applicable PCC rules for the IP-CAN session along with routing information indicating a selected TDF device which is the first one to be involved, which in the exemplary embodiment commented above would be an identifier of the first TDF device 2*a*. In this respect, the PCRF server sends the authorization decision and PCC rules to the PCEF device, optionally including an IP-CAN bearer establishment mode chosen by the PCRF server, and the gateway or the PCEF device enforces the decision.

Still with regard to the routing information and in view of the routing information provided to each TDF device and to the PCEF device, one can conclude that this routing information indicates a routing path that the IP packets shall follow to a next TDF device.

In an embodiment of the invention, not illustrated in any drawing, the determination on whether more than one TDF devices are required for this IP-CAN session, as well as the selection of the more than one TDF devices to be involved for this IP-CAN session, are carried out upon receiving at the PCRF server 1 an IP-CAN session modification from the PCEF device 3. This case is particularly useful in scenarios where the IP-CAN session establishment just triggers the submission of default PCC rules since the PCRF server still needs additional information to determine and select the required TDF devices.

In other embodiments of the invention, not illustrated in any drawing, the determination on whether more than one TDF devices shall be involved in this IP-CAN session, as well as the selection of the more than one TDF devices to be involved in this IP-CAN session, are carried out upon receiving at the PCRF server 1 an AF session establishment or modification received from an AF device 5, or a change of subscription notified from a SPR 4, or any other internal trigger. One may thus consider that the PCRF server receives a trigger for selecting one or more TDF devices, this trigger being anyone of: an IP-CAN session establishment or modification received from the PCEF device, an AF session establishment or modification received from an AF device 5, a change of subscription notified from a SPR 4, or an internal trigger.

Figure 9:
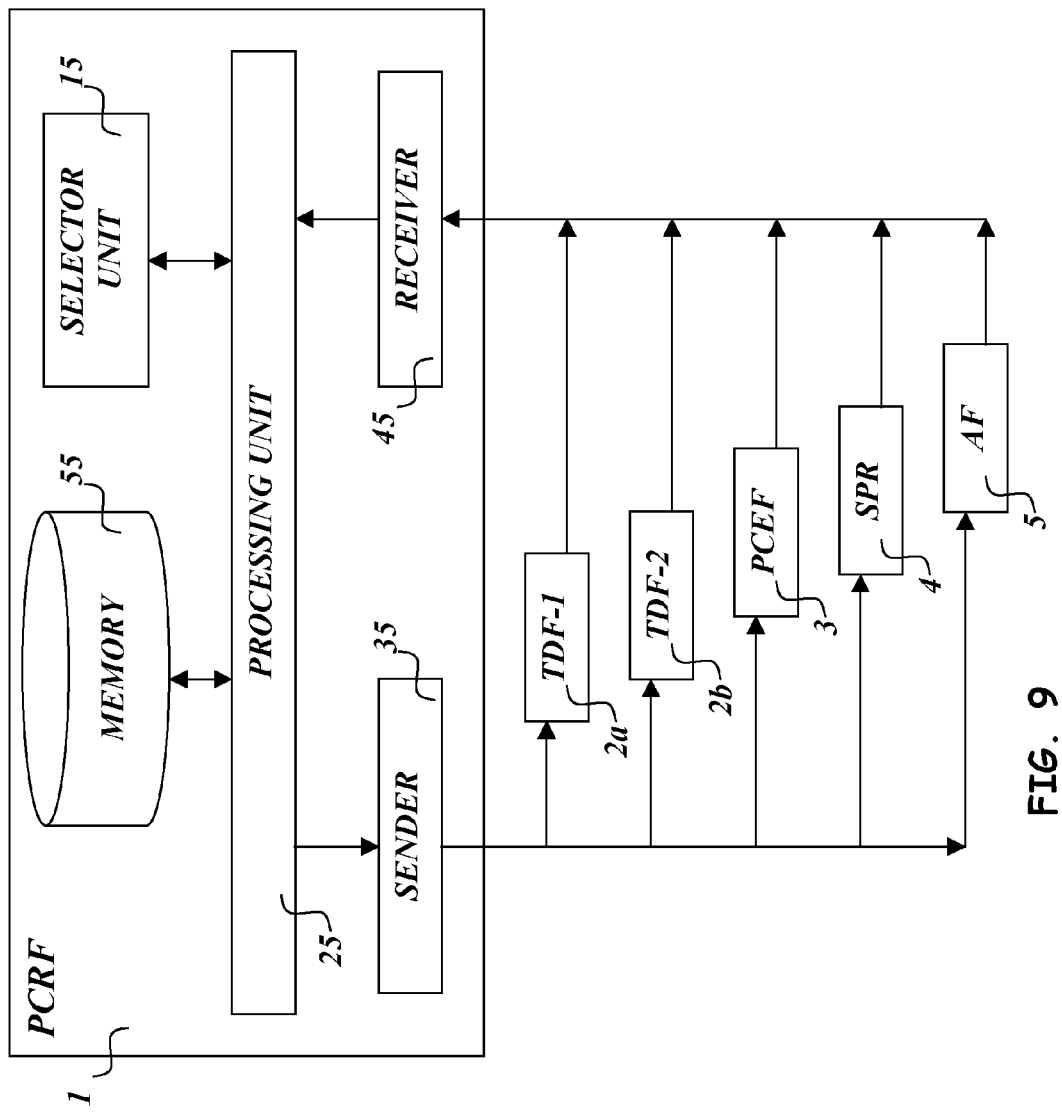
FIG. 9 shows a basic component structure of a PCRF server.

To this end, the PCRF server 1 comprises, as illustrated in FIG. 9, a processing unit 25 arranged for establishing or modifying a session with a PCEF device 3, namely a PCEF session, for an IP-CAN session; a selector unit 15 arranged for selecting more than one TDF device 2*a*, 2*b* to be provided with ADC rules for the IP-CAN session; and arranged for determining an order in which each selected TDF device is to be involved, and pieces of access information required by each selected TDF device; a sender 35 arranged for initiating a TDF session, by providing correspondingly applicable ADC rules and routing information, which indicates the order in which each selected TDF device is to be involved, towards each selected TDF device; and wherein the sender 35 is also arranged for submitting to the PCEF device 3 applicable PCC rules for the IP-CAN session along with routing information indicating a selected TDF device which is the first one to be involved.

Figure 10:
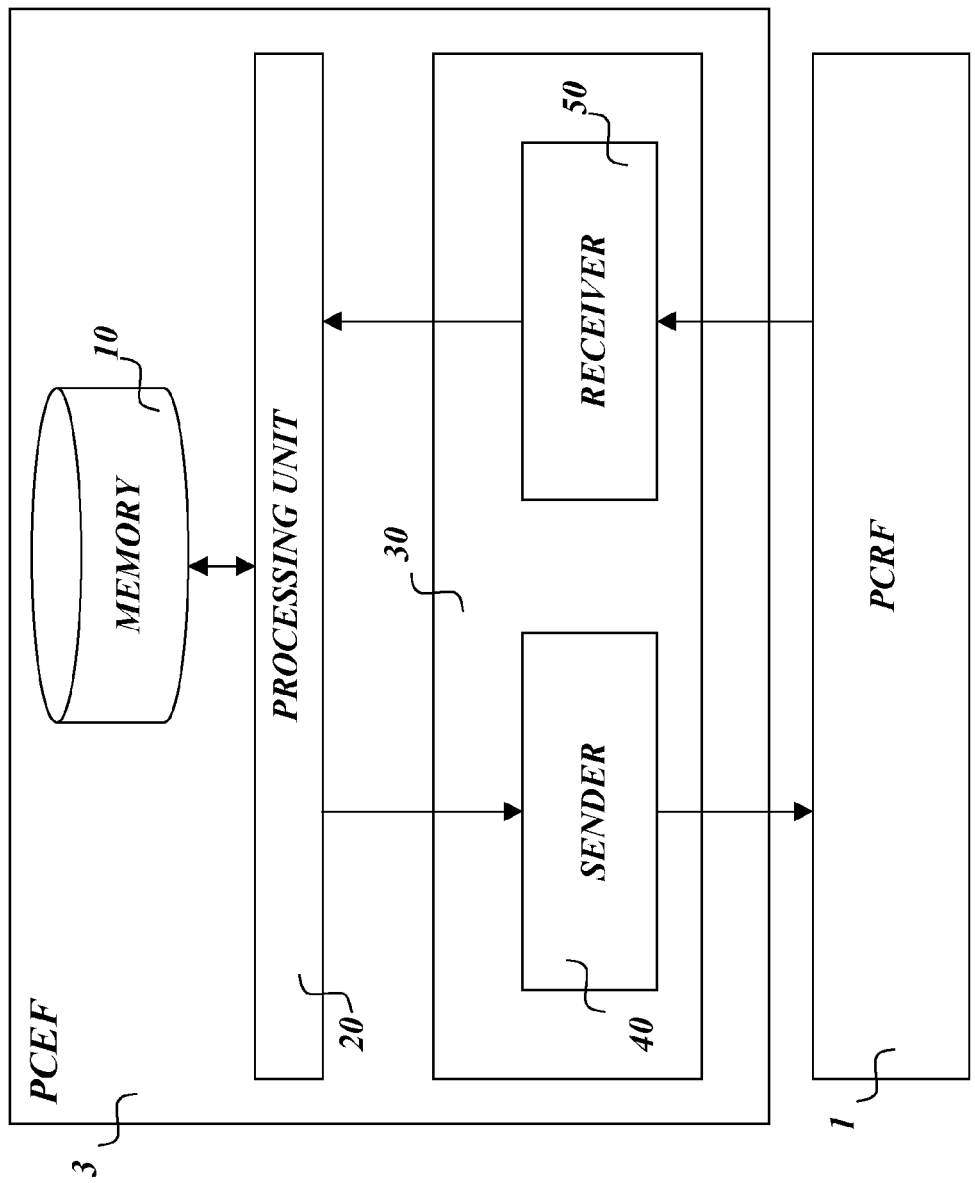
FIG. 10 shows a basic component structure of a PCEF device.

Also to this end, the PCEF device 3 comprises, as illustrated in FIG. 10, a processing unit 20 arranged for establishing or modifying the TDF session with the PCRF server 1 for the IP-CAN session; and a receiver 50 arranged for receiving from the PCRF server the applicable PCC rules for the IP-CAN session along with routing information indicating a selected TDF device which is the first one to be involved. In addition, the PCEF device may also include a memory 10 for storing the PCC rules.

Figure 11:
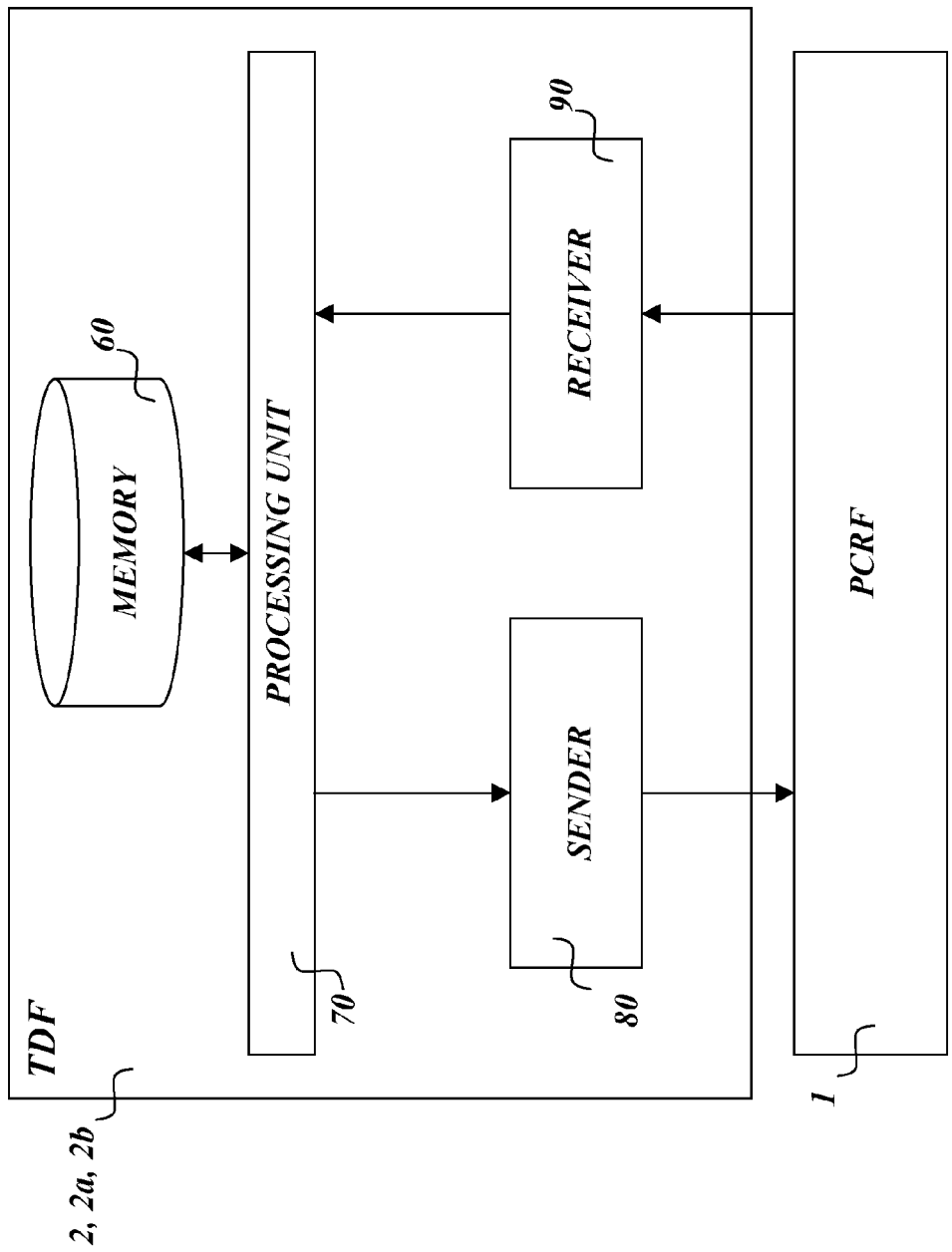
FIG. 11 shows a basic component structure of a TDF device.

Still to this end, the TDF device 2, 2*a*, 2*b* comprises, as illustrated in FIG. 11, a receiver 90 arranged for receiving from the PCRF server 1 the ADC rules for the IP-CAN session, and for receiving routing information, which indicates the order in which one or more TDF devices 2*a*, 2*b* are to be involved, and a processing unit 70 arranged for initiating a TDF session for the IP-CAN session. If an acknowledge is required by the PCRF server, the TDF device 2, 2a, 2b may further comprise a sender 80 arranged for sending such acknowledge. In addition, the TDF device may also include a memory 60 for storing the ADC rules.

In particular, regarding the routing information submitted in order to indicate a routing path that the IP packets shall follow to a next TDF device, the sender 35 of the PCRF server 1 is arranged for providing to each TDF device 2a 2b and to the PCEF device 3 an identifier of a TDF device to be involved next to the receiver TDF device or PCEF device.

Moreover, regarding the triggers for determining whether more than one TDF device can be involved and for selecting more than one TDF device to be involved in this IP-CAN session, the PCRF server 1 may further comprise a receiver 45 arranged for receiving the trigger for selecting at least one TDF device, wherein the trigger is anyone of: an IP-CAN session establishment or modification received from the PCEF device 3, an AF session establishment or modification received from an AF device 5, a change of subscription notified from the SPR 4, or an internal trigger. The selector unit 15 of the PCRF server 1 may further be arranged for selecting the more than one TDF device 2a, 2b as a response to the trigger.

Regarding the pieces of access information required by each selected TDF device, the PCRF server may extract access information from any request received from the PCEF device, such as from an IP-CAN session establishment and from an IP-CAN session modification. In particular, this access information received from the PCEF device may be anyone of: user identifier, location information, time zone, roaming information, usage information, radio access type, IP-CAN type, user equipment information, and combinations thereof.

To this end, the processing unit 25 of the PCRF server 1 may further be arranged for extracting access information from any request received from the PCEF device, the access information being anyone of: user identifier, location information, time zone, roaming information, usage information, radio access type, IP-CAN type, user equipment information, and combinations thereof.

Also to this end, the PCEF device 3 may further comprise a sender 40, as illustrated in FIG. 10, arranged for submitting to the PCRF server 1 the IP-CAN session establishment or modification along with access information selected from: user identifier, location information, time zone, roaming information, usage information, radio access type, IP-CAN type, user equipment information, and combinations thereof.

In particular, the sender 40 and the receiver 50 of the PCEF device 3 may be provided as a unique input/output unit 30. A similar approach may be provided for the sender 35 and receiver 45 of the PCRF server 1, and for the sender 80 and receiver 90 of the TDF device 2, 2a, 2b.

Once a PCEF session is established with a PCEF device and respective TDF sessions are established with selected TDF devices 2a 2b, the PCRF server 1 may correlate the PCEF session with the TDF sessions in order to better manage the different procedures that may occur afterwards and which may affect the currently established TDF sessions. To this end, the PCRF server 1 may further comprise a memory 55 arranged for correlating information related to the PCEF session with information related to the TDF sessions.

Figure 2:
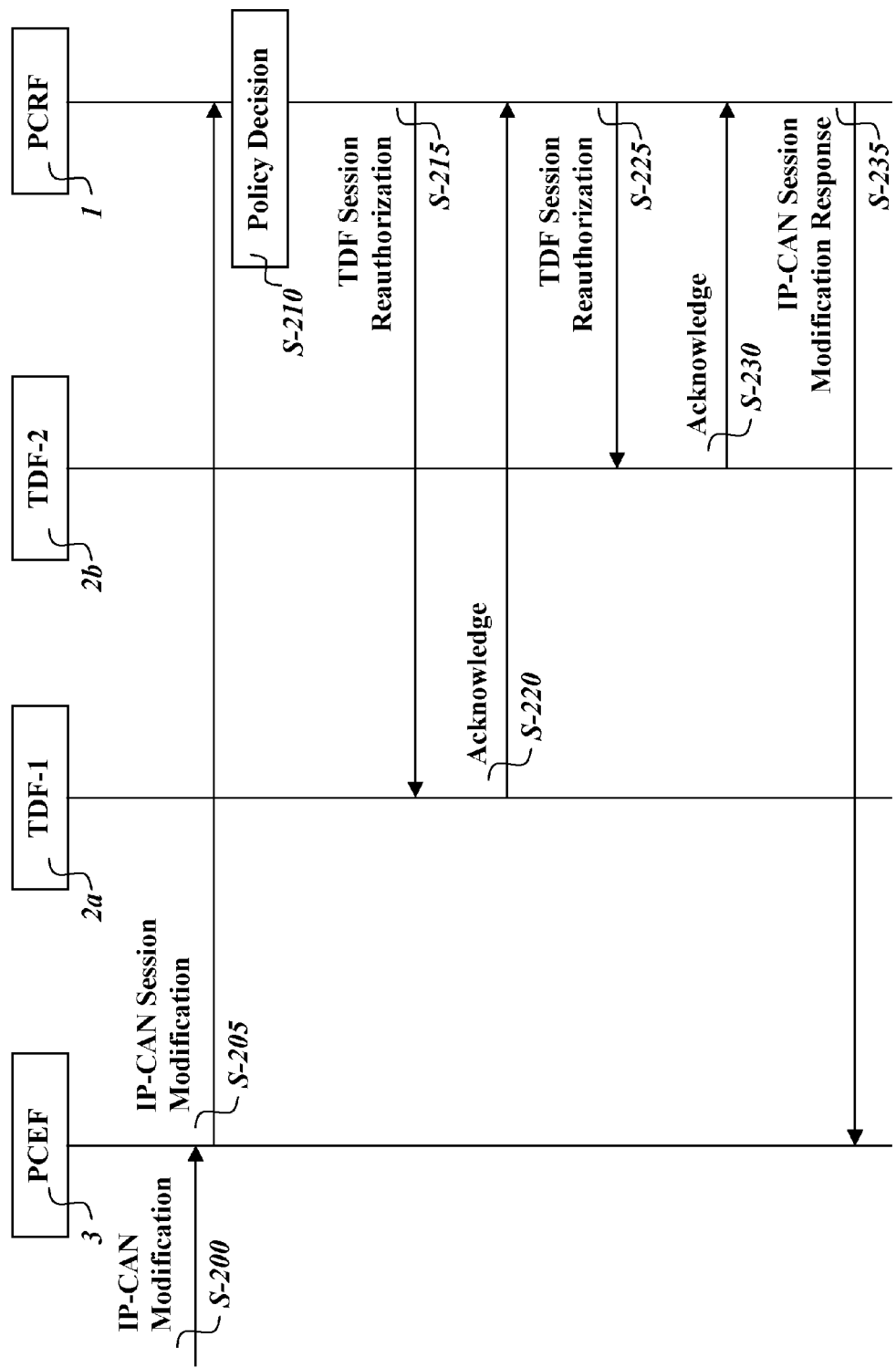
FIG. 2 exemplary represents a method of modifying TDF sessions with more than one TDF device upon the IP-CAN Session modification.

Regarding the different procedures which may affect the established TDF sessions, for instance, FIG. 2 illustrates the modification of TDF sessions with more than one TDF device upon the IP-CAN Session modification.

As FIG. 2 illustrates, upon receipt of IP-CAN Modification signalling at the PCEF device 3 during a step S-200, the PCEF device notifies the PCRF server 1 of the IP-CAN session modification for the user, during a step S-205, and indicating any relevant information related to the modification to the PCRF server 1 for handling such IP-CAN session, such as, but not limited to, event report, affected PCC rules, etc.

The PCRF server 1 receiving the IP-CAN Session Modification, assuming it had already received all required subscriber information from the SPR 4 as indicated in the embodiment illustrated in FIG. 1, makes the authorization and policy decision during a step S-210. In other embodiment commented above, the IP-CAN Session Modification might trigger the selection of TDF devices and initiation of corresponding TDF sessions as disclosed in the embodiment of FIG. 1, if this selection had not been made upon establishing the PCEF session.

Thus, assuming in this embodiment that the TDF sessions had been previously initiated, and as part of the policy decision carried out during the step S-210, the PCRF server 1 determines if there is any TDF device to be informed, determination based on the received session request type, received event type such as, for example, location change or access type change, and information stored at the PCRF server for each TDF device 2a 2b. To this end, the memory 55 of the PCRF server 1, as illustrated in FIG. 9, may be used to search the required information amongst correlated PCEF session and TDF sessions.

Also as part of the policy decision carried out during the step S-210, and for each selected TDF device, the PCRF server may decide new ADC rules to be provided. This may include rules activation, deactivation and modification. For this decision the PCRF server may consider information lately received with the IP-CAN session modification from the PCEF device 3 as well as information of the PCEF session likely saved in the memory 55 of the PCRF server 1.

Back to the sequence of actions illustrated in FIG. 2, once the previous decisions are made, the PCRF server may submit to selected TDF devices 2a 2b, during steps S-215 and S-225, respective TDF session reauthorizations, wherein each TDF session reauthorization may include new ADC rules and, if required, information received with the IP-CAN session modification from the PCEF device 3.

Upon receipt of corresponding acknowledge from each selected TDF device during the steps S-220 and S-230, if required, the PCRF server 1 sends during a step S-235 an IP-CAN session modification response to the PCEF device 3 with information about the decisions made; and, the PCEF device 3, or the gateway, enforces the decision. In particular, these decisions may include new PCC rules, event triggers, IP-CAN bearer establishment mode, etc, if anyone has changed.

Figure 3:
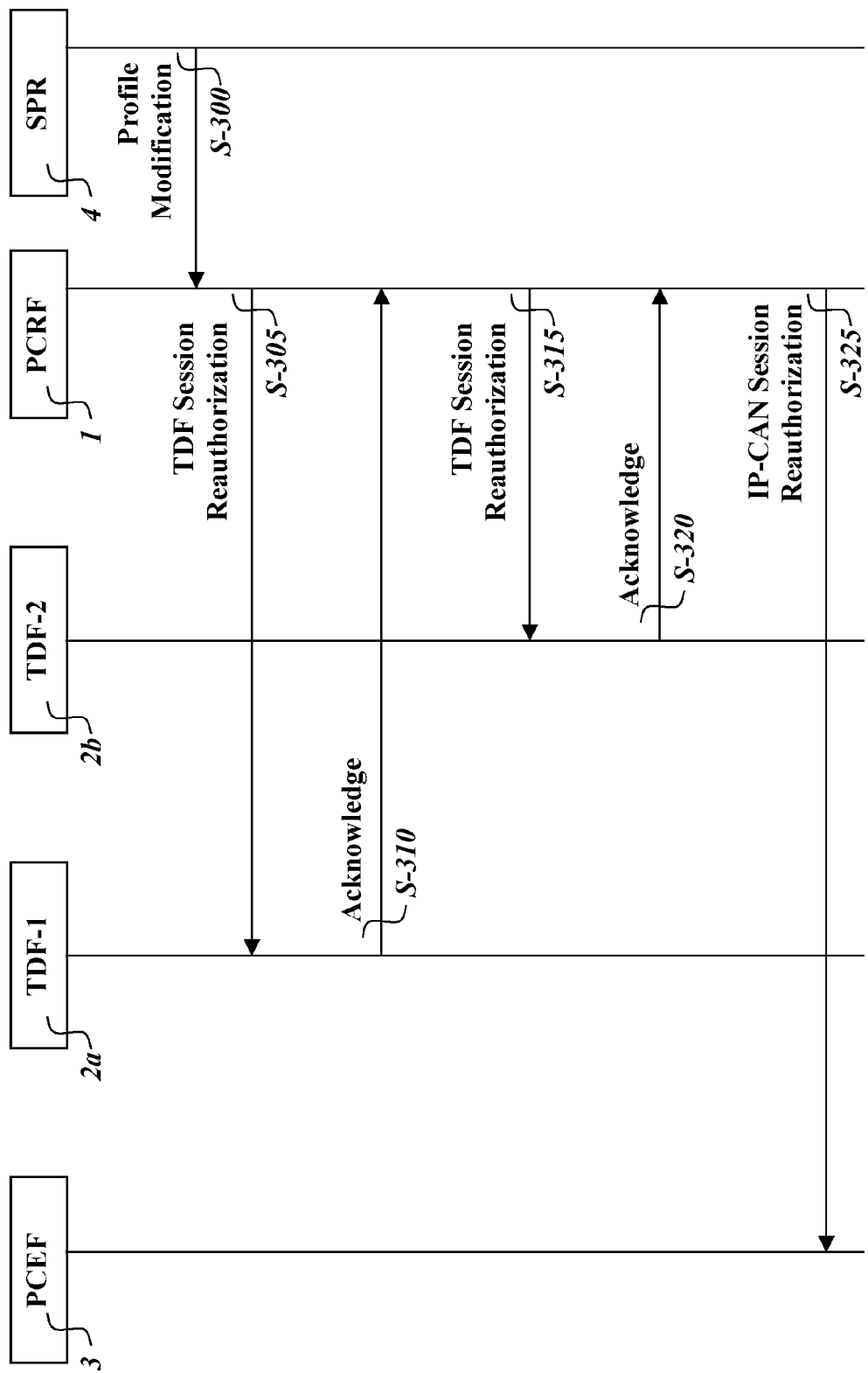
FIG. 3 exemplary represents a method of modifying TDF sessions with more than one TDF device upon a subscriber profile modification.

Regarding other procedures which may affect the established TDF sessions, FIG. 3 illustrates modifying TDF sessions with more than one TDF device upon a subscriber profile modification.

As illustrated in FIG. 3, upon receipt of a subscriber profile modification from a SPR 4 during a step S-300, the PCRF server 1 determines which TDF sessions are affected by the modification of subscription data and should be reauthorized. The routing information, that is, the order in which the TDF devices are to be involved, is also revised for these reauthorizations. Besides, the PCRF server 1 may generate new ADC rules depending on the modification of subscription data.

Once these decisions are made, the PCRF server may submit to selected TDF devices 2a 2b, during steps S-305 and S-315, respective TDF session reauthorizations, wherein each TDF session reauthorization may include new ADC rules, if required.

Upon receipt of corresponding acknowledge from each selected TDF device during steps S-310 and S-320, if required, the PCRF server 1 sends during a step S-325 an IP-CAN session modification response to the PCEF device 3 with information about the decisions made; and, the PCEF device 3, or the gateway, enforces the decision. In particular, these decisions may include new PCC rules, event triggers, IP-CAN bearer establishment mode, etc, if anyone has been modified.

Figure 4:
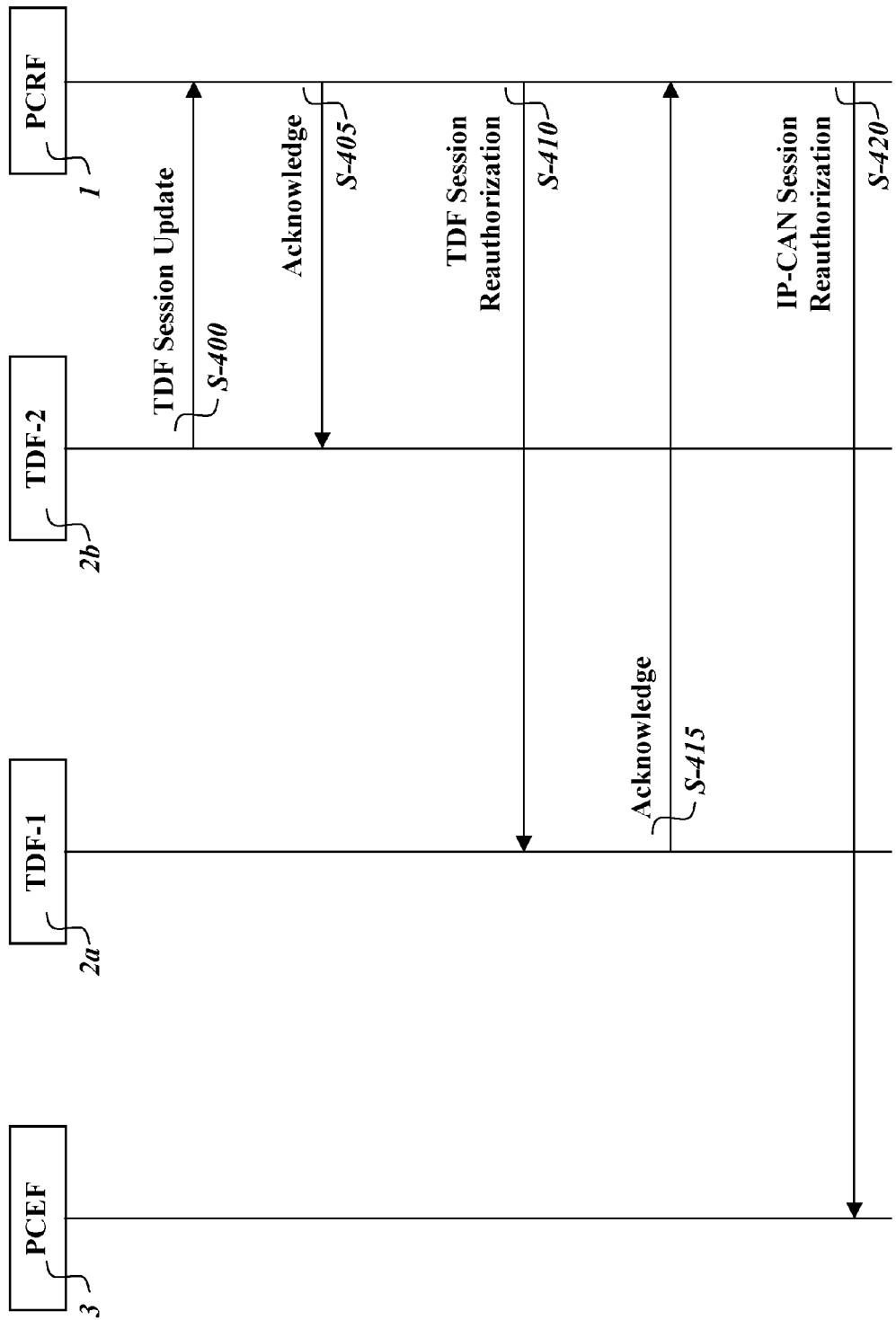
FIG. 4 exemplary represents a method of modifying TDF sessions with more than one TDF device upon modification of a given TDF session.

Regarding other procedures which may affect the established TDF sessions, FIG. 4 illustrates modifying TDF sessions with more than one TDF device upon modification of a given TDF session previously established.

As illustrated in FIG. 4, upon receipt of a TDF session update, during a step S-400, reporting an event from a second TDF device 2b towards the PCRF server 1, the PCRF server evaluates the information received in order to determine whether the PCEF session and other TDF sessions have to be reauthorized and whether any modification of routing information is required. Then, the PCRF server 1 acknowledges and returns the evaluation result during a step S-405 to the reporting TDF device 2b.

In particular, the event reported with the TDF session update may indicate a detected application and its service data flow description. To this end, the TDF device 2, 2a, 2b comprises a sender 80 arranged for reporting a detected application and its service data flow description to the PCRF server.

Provided that a reauthorization has been determined for other TDF sessions and the PCEF session, the PCRF server submits a TDF session reauthorization during a step S-410 to the first TDF device 2a and, upon receiving the acknowledge from the TDF device 2a during a step S-415, if required, the PCRF server may also reauthorize the PCEF session during a step S-420 to the PCEF device 3.

Figure 5:
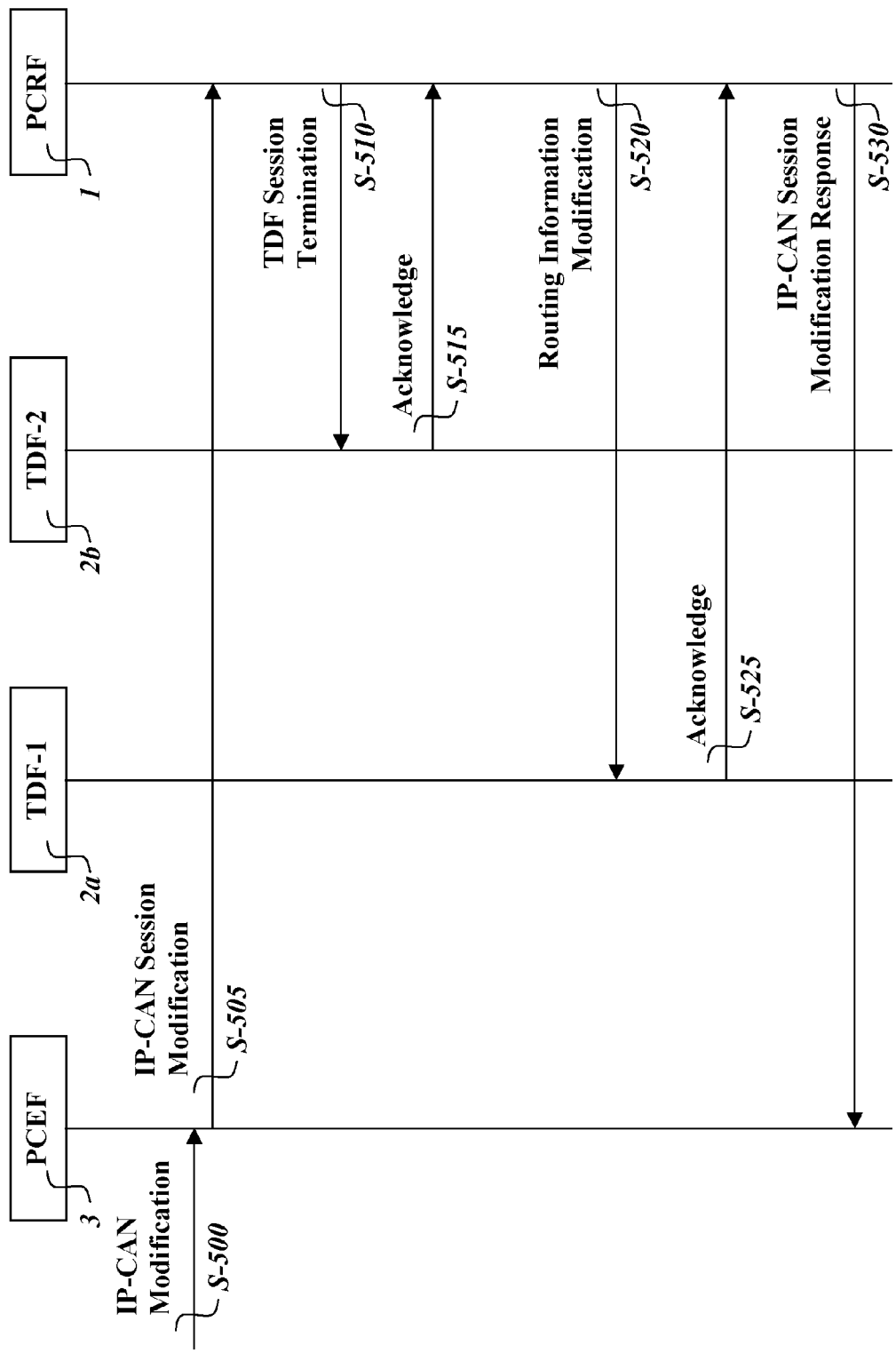
FIG. 5 exemplary represents a method of terminating one or more TDF sessions with at least one TDF device upon the IP-CAN Session modification.

Regarding other procedures which may affect the established TDF sessions, FIG. 5 illustrates terminating one or more TDF sessions with at least one TDF device upon the IP-CAN Session modification.

As illustrated in FIG. 5, upon receipt of IP-CAN Modification signalling at the PCEF device 3 during a step S-500, the PCEF device notifies the PCRF server 1 of the IP-CAN session modification for the user, during a step S-505, and indicating any relevant information related to the modification to the PCRF server 1 for handling such IP-CAN session, such as commented above in respect of the embodiment illustrated in FIG. 2.

The PCRF server 1 receiving the IP-CAN Session Modification may decide the termination of some TDF sessions and, in such a case, determining to what extent the order in which the TDF devices are involved is affected. In other words, upon determining termination of a particular TDF session, the routing information to be submitted towards other TDF devices and PCEF device is determined again.

In the exemplary embodiment illustrated in FIG. 5, the PCRF server 1 terminates the TDF session during a step S-510 towards the second TDF device 2b and submits the modification of the routing information during a step S-520 towards the first TDF device 2a. Upon receiving respective acknowledges from said first and second TDF devices 2b 2a during steps S-515 and S-525, if required, the PCRF server 1 submits during a step S-530 an IP-CAN session modification response to the PCEF device 3 with information about the decisions made; and, the PCEF device 3, or the gateway, enforces the decision. In particular, these decisions may include the modification of the routing information, if required.

Figure 6:
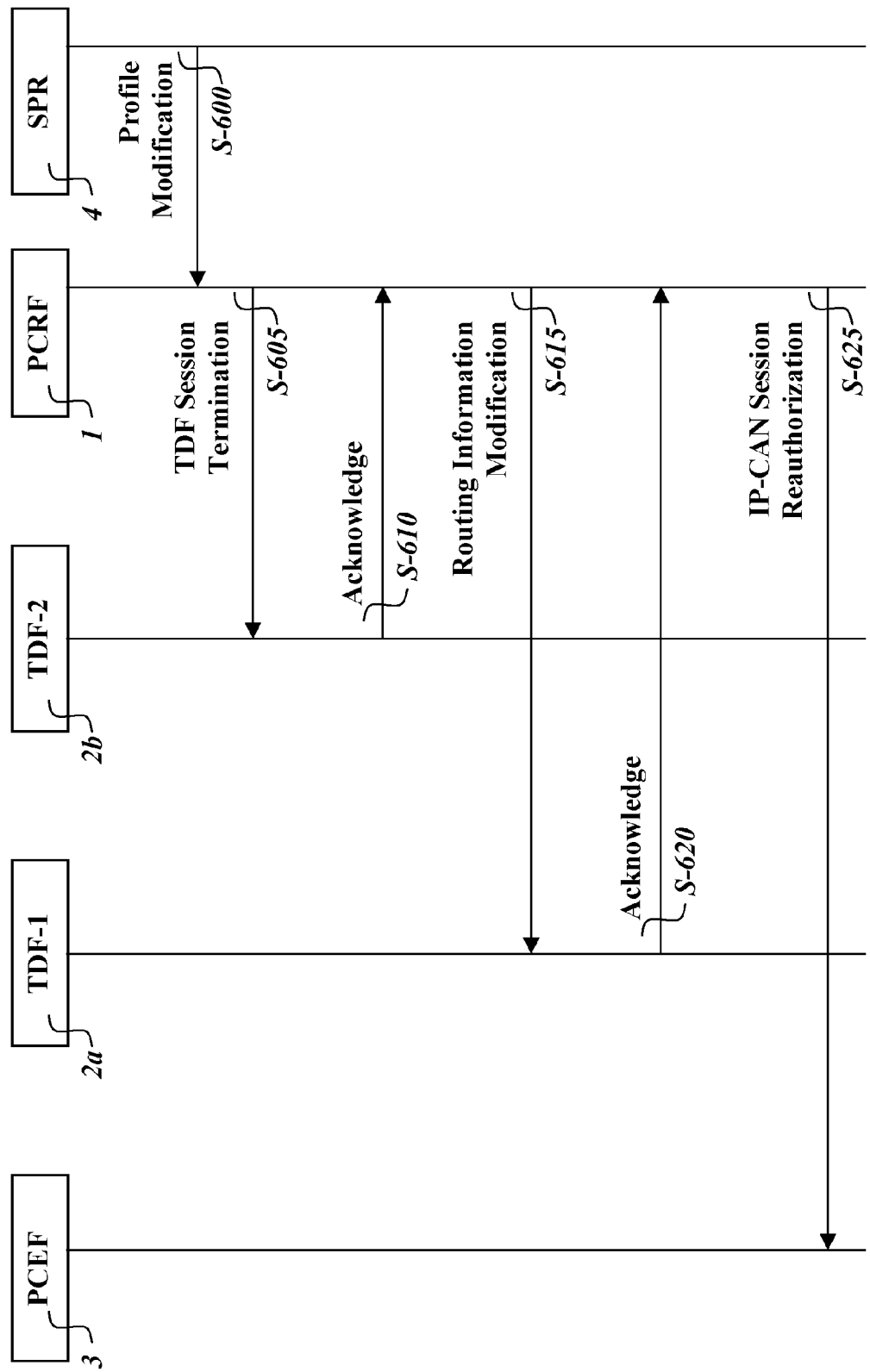
FIG. 6 exemplary represents a method of terminating one or more TDF sessions with at least one TDF device upon subscriber profile modification.

Regarding other procedures which may affect the established TDF sessions, FIG. 6 illustrates terminating one or more TDF sessions with at least one TDF device upon subscriber profile modification.

As illustrated in FIG. 6, upon receipt of a subscriber profile modification from the SPR 4 during a step S-600, the PCRF server 1 may decide the termination of some TDF sessions and, in such a case, determining to what extent the order in which the TDF devices are involved is affected. In other words, upon determining termination of a particular TDF session, the routing information to be submitted towards other TDF devices and PCEF device is determined again. Regarding possible causes to terminate some TDF session, the PCRF server might determine that, for example, Virus detection is not to be applied any longer because the subscriber has unsubscribed this service, and this is the sort of information that can be updated from the SPR 4.

In the exemplary embodiment illustrated in FIG. 6, the PCRF server 1 terminates the TDF session towards the second TDF device 2b during a step S-605 and submits the modification of the routing information during a step S-615 towards the first TDF device 2a. Upon receiving respective acknowledges from said first and second TDF devices 2b 2a during steps S-610 and S-620, if required, the PCRF server 1 may submit during a step S-625 an IP-CAN session reauthorization to the PCEF device 3 with information about new data values received in the subscriber profile modification and about the decisions made; and, the PCEF device 3, or the gateway, enforces the decision. In particular, these decisions may include the modification of the routing information, if required.

Figure 7:
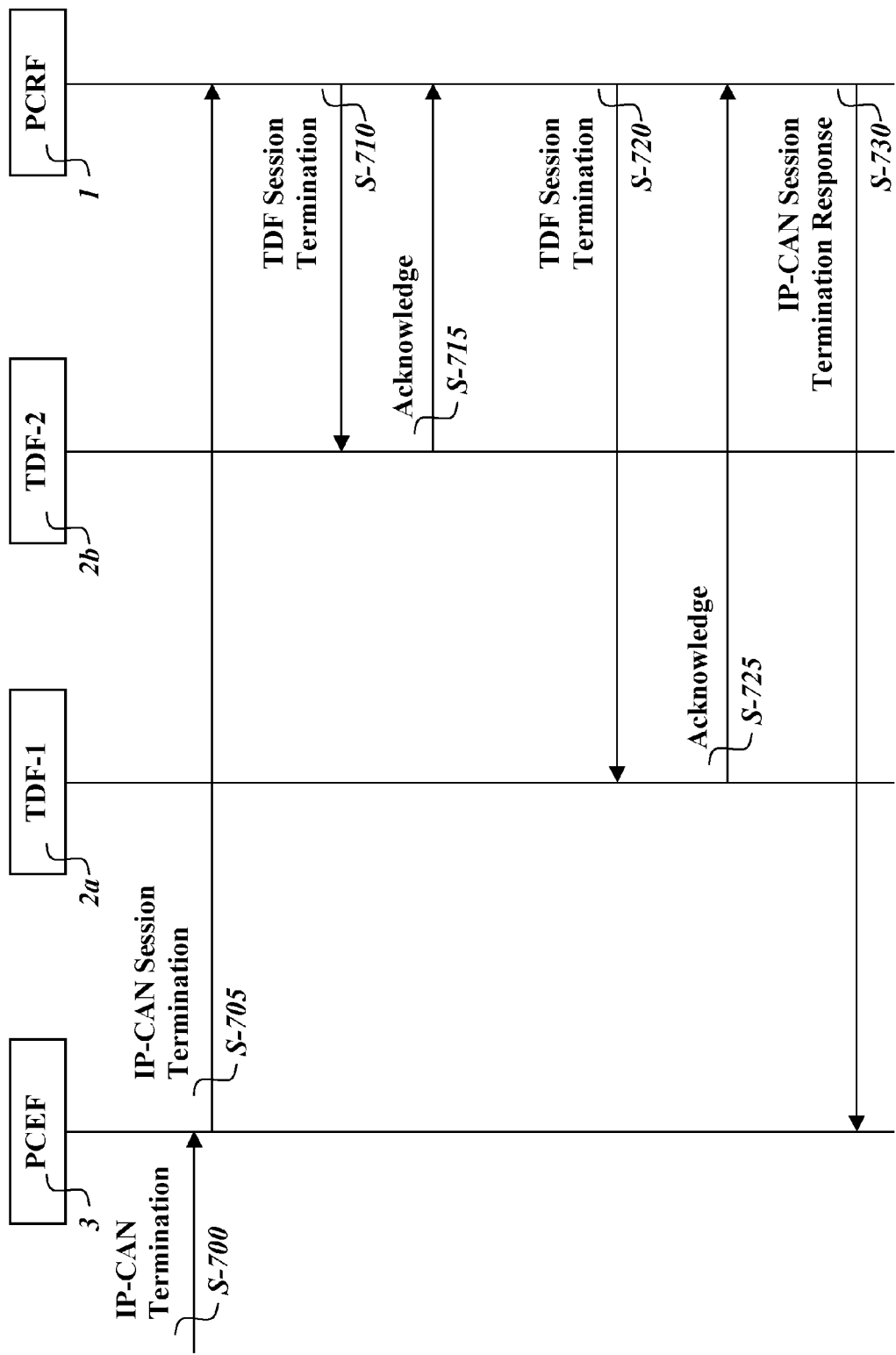
FIG. 7 exemplary represents a method of terminating all TDF sessions with more than one TDF device upon the IP-CAN Session termination.

Regarding other procedures which may affect the established TDF sessions, FIG. 7 illustrates terminating all TDF sessions with more than one TDF device upon the IP-CAN Session termination.

As illustrated in FIG. 7, upon receipt of IP-CAN Termination signalling at the PCEF device 3 during a step S-700, the PCEF device notifies the PCRF server 1 of the IP-CAN session termination for the user, during a step S-705.

The PCRF server 1 receiving the IP-CAN session termination initiates the termination of all existing TDF sessions for the IP-CAN session towards the TDF devices 2a 2b during steps S-710 and S-720. Upon receiving respective acknowledges from the TDF devices 2a 2b during steps S-715 and S-725, if required, the PCRF server 1 submits during a step S-730 an IP-CAN session termination response to the PCEF device 3.

Generally speaking, in accordance with the embodiments illustrated in FIG. 5, FIG. 6 and FIG. 7, as well as in accordance with other embodiments not illustrated in any drawing, one may consider that upon receiving at the PCRF server 1 a second trigger, wherein the second trigger is anyone of: an IP-CAN session modification or termination from the PCEF device, an AF session modification or termination from the AF device, a change of subscription notified from a Subscription Profile Repository "SPR", or an internal second trigger, the PCRF server may initiate a TDF session termination towards at least one selected TDF device.

To this end, the receiver 45 of the PCRF server 1 may be arranged for receiving a second trigger, wherein the second trigger is anyone of: an IP-CAN session modification or termination from the PCEF device, an AF session modification or termination from the AF device, or an internal second trigger; and the sender 35 of the PCRF server 1 may be arranged for initiating a TDF session termination towards at least one selected TDF device.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of coordinating sessions for a user respectively established with a Policy and Charging Enforcement Function (PCEF) device and a plurality of stand-alone Traffic Detection Function (TDF) devices of a Policy and Charging Control (PCC) architecture with a Policy and Charging control Rules Function (PCRF) server, the method comprising:
one of establishing and modifying, at a PCRF server, a PCEF session for an internet protocol (IP) Connectivity Access Network (IP-CAN) session;
selecting, at the PCRF server, more than one stand-alone TDF device to be provided with Application and Detection Control (ADC) rules for the IP-CAN session;
determining, at the PCRF server, an order in which each selected stand-alone TDF device is to be involved, and pieces of access information required by each selected stand-alone TDF device;
initiating a TDF session, providing correspondingly applicable ADC rules, and providing routing information, which indicates the order in which each selected stand-alone TDF device is to be involved, from the PCRF server towards each selected stand-alone TDF device; and
submitting, from the PCRF server to the PCEF device, applicable PCC rules for the IP-CAN session along with routing information indicating a selected stand-alone TDF device which is the first stand-alone TDF device to be involved.

2. The method of claim 1, further comprising receiving at the PCRF server a trigger for selecting at least one stand-alone TDF device.

3. The method of claim 2, wherein the trigger is one of:
one of an IP-CAN session establishment and IP-CAN session modification received from the PCEF device;
one of an Application Function (AF) session establishment and AF session modification received from an AF device;
a change of subscription notified from a Subscription Profile Repository (SPR); and
an internal trigger.

4. The method of claim 1, further comprising extracting by the PCRF server access information from any request received from the PCEF device.

5. The method of claim 4, wherein the access information received from the PCEF device is at least one of: user identifier, location information, time zone, roaming information, usage information, radio access type, IP-CAN type and user equipment information.

6. The method of claim 1, wherein the routing information provided from the PCRF server to the PCEF device and stand-alone TDF devices indicates a routing path that the IP packets shall follow to a next stand-alone TDF device.

7. The method of claim 1, further comprising correlating the PCEF session, which is established with the PCEF device, with the TDF sessions, which are respectively established with each selected stand-alone TDF device.

8. The method of claim 1, wherein each selected stand-alone TDF device is specialized in at least one function selected from at least one of: content insertion, content filtering, fraud detection, virus scan and data compression.

9. The method of claim 1, further comprising reporting a detected application and detected application service data flow description from at least one selected stand-alone TDF device to the PCRF server.

10. The method of claim 1, further comprising :
receiving, at the PCRF server, a second trigger, wherein the second trigger is one of:
one of an IP-CAN session modification and IP-CAN session termination from the PCEF device;
one of an AF session modification AF session termination from the AF device;
a change of subscription notified from a Subscription Profile Repository (SPR); and
an internal second trigger; and
initiating, from the PCRF server, a TDF session termination towards at least one selected stand-alone TDF device.

11. A Policy and Charging control Rules Function (PCRF) server of a Policy and Charging Control (PCC) architecture with a Policy and Charging Enforcement Function (PCEF) device and a plurality of stand-alone Traffic Detection Function (TDF) devices, the PCRF server comprising:
a processing unit configured for one of establishing and modifying a session with a PCEF device for an IP Connectivity Access Network (IP-CAN) session;
a selector unit configured for:
selecting more than one stand-alone TDF device to be provided with Application and Detection Control (ADC) rules for the IP-CAN session; and
determining an order in which each selected stand-alone TDF device is to be involved, and pieces of access information required by each selected stand-alone TDF device;
a sender configured for:
initiating a TDF session, by providing correspondingly applicable ADC rules and routing information, which indicates the order in which each selected stand-alone TDF device is to be involved, towards each selected stand-alone TDF device; and
submitting to the PCEF device applicable PCC rules for the IP-CAN session along with routing information indicating a selected stand-alone TDF device which is the first one to be involved.

12. The PCRF server of claim 11, further comprising a receiver configured for receiving a trigger for selecting at least one stand-alone TDF device, wherein the trigger is one of:
one of an IP-CAN session establishment and IP-CAN session modification received from the PCEF device;
one of an Application Function (AF) session establishment AF session modification received from an AF device;
a change of subscription notified from a Subscription Profile Repository;
an internal trigger; and
wherein the selector unit is further configured for selecting the more than one stand-alone TDF device as a response to the trigger.

13. The PCRF server of claim 11, wherein the processing unit is further configured for extracting access information from any request received from the PCEF device, the access information being at least one of: user identifier, location information, time zone, roaming information, usage information, radio access type, IP-CAN type and user equipment information.

14. The PCRF server of claim 11, further comprising a memory configured for correlating information related to the PCEF session, which is established with the PCEF device, with information related to the TDF sessions, which are respectively established with each selected stand-alone TDF device.

15. The PCRF server of claim 11, wherein the receiver is configured for receiving a second trigger, wherein the second trigger is one of:
  one of an IP-CAN session modification and IP-CAN session termination from the PCEF device;
  one of an AF session modification and AF session termination from the AF device;
  an internal second trigger; and
  wherein the sender is further configured for initiating a TDF session termination towards at least one selected stand-alone TDF device.

16. A Policy and Charging Enforcement Function (PCEF) device of a Policy and Charging Control (PCC) architecture with a Policy and Charging control Rules Function (PCRF) server and a plurality of stand-alone Traffic Detection Function (TDF) devices, the PCEF device comprising:
  a processing unit configured for one of establishing and modifying a TDF session with a PCRF server for an IP Connectivity Access Network IP-CAN session; and
  a receiver configured for receiving from the PCRF server applicable PCC rules for the IP-CAN session along with routing information indicating a selected stand-alone TDF device which is the first one to be involved.

17. The PCEF device of claim 16, further comprising a sender configured for submitting to the PCRF server one of an IP-CAN session establishment IP-CAN session modification along with access information selected from at least one of: user identifier, location information, time zone, roaming information, usage information, radio access type, IP-CAN type and user equipment information.

18. The PCEF device of claim 16, wherein the routing information received from the PCRF server indicates a routing path that the IP packets shall follow to a next stand-alone TDF device.

19. A Traffic Detection Function (TDF) device acting as a stand-alone device of a Policy and Charging Control (PCC) architecture with a Policy and Charging control Rules Function (PCRF) server and a Policy and Charging Enforcement Function (PCEF) device, the stand-alone TDF device comprising:
  a receiver configured for receiving from a PCRF server Application and Detection Control (ADC) rules for an IP Connectivity Access Network (IP-CAN) session, and for receiving routing information, which indicates the order in which one or more stand-alone TDF devices are to be involved; and
  a processing unit configured for initiating a TDF session for the IP-CAN session.

20. The TDF device of claim 19, wherein the routing information received from the PCRF server indicates a routing path that the IP packets shall follow to a next stand-alone TDF device.

21. The TDF device of claim 19, further comprising a sender configured for reporting a detected application and detected application service data flow description to the PCRF server.

22. A non-transitory storage medium storing a computer program for coordinating sessions for a user respectively established with a Policy and Charging Enforcement Function (PCEF) device and a plurality of stand-alone Traffic Detection Function (TDF) devices of a Policy and Charging Control (PCC) architecture with a Policy and Charging control Rules Function (PCRF) server, the computer program comprising executable code which when executed on the computer, causes the computer to:
  one of establish and modify, at a PCRF server, a PCEF session for an internet protocol (IP) Connectivity Access Network (IP-CAN) session;
  select, at the PCRF server, more than one stand-alone TDF device to be provided with Application and Detection Control (ADC) rules for the IP-CAN session;
  determine, at the PCRF server, an order in which each selected stand-alone TDF device is to be involved, and pieces of access information required by each selected stand-alone TDF device;
  initiate a TDF session, provide correspondingly applicable ADC rules, and provide routing information, which indicates the order in which each selected stand-alone TDF device is to be involved, from the PCRF server towards each selected stand-alone TDF device; and
  submit, from the PCRF server to the PCEF device, applicable PCC rules for the IP-CAN session along with routing information indicating a selected stand-alone TDF device which is the first TDF to be involved.

* * * * *